United States Patent
Liu et al.

(10) Patent No.: US 7,502,382 B1
(45) Date of Patent: Mar. 10, 2009

(54) METHOD AND APPARATUS FOR MULTICAST PACKET DISTRIBUTION IN A SATELLITE CONSTELLATION NETWORK

(75) Inventors: Yu-Jih Liu, Ledgewood, NJ (US); Jon William Schnabel, Nutley, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 939 days.

(21) Appl. No.: 10/952,906

(22) Filed: Sep. 30, 2004

(51) Int. Cl.
*H04J 3/26* (2006.01)

(52) U.S. Cl. .................. 370/432; 370/316; 370/400; 370/225; 455/3.02; 455/427; 455/12.1

(58) Field of Classification Search ............... 455/3.02, 455/427, 12.1, 445; 370/432, 338, 310, 225, 370/227, 228, 328, 400, 316
See application file for complete search history.

(56) References Cited

U.S. PATENT DOCUMENTS

| | | | |
|---|---|---|---|
| 5,457,808 A | 10/1995 | Osawa et al. |
| 5,802,278 A | 9/1998 | Isfeld et al. |
| 6,018,659 A | 1/2000 | Ayyagari et al. |
| 6,160,797 A | 12/2000 | Robert, III et al. |
| 6,182,147 B1 | 1/2001 | Farinacci |
| 6,307,861 B1 | 10/2001 | Hogg et al. |
| 6,320,520 B1 | 11/2001 | Luby |
| 6,377,561 B1 | 4/2002 | Black et al. |
| 6,385,647 B1 | 5/2002 | Willis et al. |
| 6,389,453 B1 | 5/2002 | Willis |
| 6,400,925 B1 | 6/2002 | Tirabassi et al. |
| 6,411,607 B1 | 6/2002 | Robert, III et al. |
| 6,463,260 B1 | 10/2002 | Nagai |
| 6,625,131 B1 | 9/2003 | Yee-Madera et al. |
| 6,654,344 B1 | 11/2003 | Toporek et al. |
| 6,658,463 B1 | 12/2003 | Dillon et al. |
| 6,674,994 B1 | 1/2004 | Fell et al. |
| 6,763,005 B1 | 7/2004 | Halberstadt et al. |
| 2002/0006116 A1 | 1/2002 | Burkhart |
| 2002/0065078 A1 | 5/2002 | Cohen et al. |
| 2002/0069416 A1 | 6/2002 | Stiles |
| 2002/0077087 A1 | 6/2002 | Li |

(Continued)

OTHER PUBLICATIONS

Eylem Ekici, A Multicast Algorithm for LEO Satellite IP Networks, Apr. 2002, IEEE.*

(Continued)

*Primary Examiner*—Ricky Ngo
*Assistant Examiner*—Kibrom T Hailu
(74) *Attorney, Agent, or Firm*—Edell, Shapiro & Finnan, LLC

(57) ABSTRACT

A satellite network constellation employs a technique for multicasting packets through the network according to the present invention. The network comprises plural satellites in plural orbital planes with each satellite equipped with a plurality of high-speed point-to-point full duplex radio links for inter-satellite communications. A node intending to send a multicast packet to a multicast group or a set of destination satellite nodes initially sends the packet to the orbital planes that include the group members. Once reaching the plane, in-plane routing techniques are used to forward the packet to the intended group members. If there are broken or disabled links, an alternative path is taken to forward the packet without disrupting the functioning links.

31 Claims, 9 Drawing Sheets

U.S. PATENT DOCUMENTS

| | | | |
|---|---|---|---|
| 2002/0106985 | A1 | 8/2002 | Sato et al. |
| 2002/0136201 | A1 | 9/2002 | Buchsbaum et al. |
| 2002/0150060 | A1* | 10/2002 | Montpetit .................. 370/316 |
| 2002/0181464 | A1 | 12/2002 | Tsuchiya et al. |
| 2002/0181465 | A1 | 12/2002 | Tsuchiya et al. |
| 2002/0199200 | A1 | 12/2002 | Addington |
| 2003/0032391 | A1 | 2/2003 | Schweinhart et al. |
| 2003/0045231 | A1 | 3/2003 | Chapelle et al. |
| 2003/0079022 | A1 | 4/2003 | Toporek et al. |
| 2003/0179742 | A1 | 9/2003 | Ogier et al. |
| 2004/0033777 | A1 | 2/2004 | Farineau et al. |

OTHER PUBLICATIONS

Ekici et al., "A Multicast Routing Algorithm for LEO Satellite IP Networks", IEEE/ACM Transactions on Networking (TON), vol. 10, No. 2, Apr. 2002, pp. 183-192.

Chiang, C. et al.; "Adaptive Shared Tree Multicast in Mobile Wireless Networks"; Globecom, IEEE 1998; pp. 1817-1822.

Chiang, C. et al.; "On-Demand Multicast in Mobile Wireless Networks"; Computer Science Department, University of California, Los Angeles; 9 pages.

Chiang, C. et al.; "Forwarding Group Multicast Protocol (FGMP) for Multihop, Mobile Wireless Networks"; ACM-Baltzer Journal of Cluster Computing, Special Issue on Mobile Computing; vol. 1, Np/o 2, 1998; 16 pages.

Adams, A. et al.; "Protocol Independent Multicast—Dense Mode (PIM-DM): Protocol Specification (Revised)"; Internet Engineering Task Force, Internet Draft, Sep. 2003; pp. 1-54.

Fenner, B. et al.; "Multicast Source Discovery Protocol (MSDP)"; Internet Draft, Oct. 2003; pp. 1-19.

Ballardie, A.; "Core Based Trees (CBT version 2) Multicast Routing"; RFC 2189, Sep. 1997; retrieved from Internet Sep. 20, 2004; www.faqs.org/rfcs/rfc2189.html; pp. 1-19.

Handley, M. et al.; "Bi-directional Protocol Independent Multicast (BIDIR-PIM)"; Internet Engineering Task Force, Internet Draft, Jun. 2003; pp. 1-44.

Bommaiah, M. et al.; "AMRoute: Adhoc Multicast Routing Protocol"; Internet Engineering Task Force, Internet Draft, Aug. 6, 1998; pp. 1-24.

* cited by examiner

METHOD AND APPARATUS FOR MULTICAST PACKET DISTRIBUTION IN A SATELLITE CONSTELLATION NETWORK

BACKGROUND OF THE INVENTION

1. Technical Field

The present invention generally relates to satellite communication networks. In particular, the present invention pertains to a technique for multicasting packets through a satellite network constellation comprising plural satellites in plural orbital planes.

2. Discussion of the Related Art

There exists a plurality of multicasting protocol techniques. In general, these protocols belong to three major categories: source based multicast protocol, Core Based Tree (CBT) multicast protocol, and Forwarding Group Multicast Protocol (FGMP). In a source based multicast protocol, every node of the network has a multicast tree for transmitting multicast data to other nodes. In a CBT based multicast protocol, a single tree is created at the core of the network and the core is responsible for sending the multicast data. Finally, in the FGMP based protocol, a forwarding group is created that is responsible for forwarding the multicast data to other nodes in the network.

If all network nodes are stationary, there is no need to update an associated routing table. However, if the nodes of the network move, links between nodes may be broken, while new links may be created. Accordingly, modified link-state information must be forwarded to all nodes so that routing tables can be created and/or modified according to the new link-state information. The Dykstra Algorithm is typically employed to find the shortest or most cost effective path for routing the packets through the network.

Conventional techniques for multicasting through networks suffer from several disadvantages. For example, the above-mentioned multicast protocols are primarily directed toward Ad-Hoc networks. These types of networks do not include an infrastructure that is available to assist in routing data packets. Further, node mobility disrupts existing routing paths, where new link state information is flooded to enable the network to adapt to the changing environment. If the rate of the link state information updates are insufficient with respect to the speed of the node movement, there is significant performance degradation.

The primary performance issues pertaining to Ad-Hoc networks include scalability and reliability. Scalability refers to the ability of the protocol to function only on a smaller number of nodes and fail in response to significant increases in network size. Reliability refers to network performance, where the stability of completion rate and delay of packet transmissions may change due to node mobility, traffic, message size, etc. The scalability and reliability features require transmission overhead in order to build and maintain the network.

With respect to satellite constellation networks, these networks employ radio links over distances of tens of thousands of kilometers. Thus, the time required to propagate link state updates over the entire constellation network renders use of current multicast protocols impractical. Further, network performance degradation occurs with existing multicast protocols during periods of time that the link state information of each individual satellite is inconsistent with the rest of the constellation. Scalability is typically not an issue for a satellite constellation network since the total number of nodes in the network is relatively small compared to the number of nodes existing multicast protocols are designed to accommodate. Moreover, since the network overhead required to support scalability and mobility in existing multicast protocols is unnecessary for satellite networks, the protocols yield inefficient bandwidth utilization when applied to satellite networks.

The present invention essentially overcomes the aforementioned drawbacks. Initially, satellites move in predictable orbits based on known Keplarian parameters which simplifies routing calculations. The present invention takes advantage of the predictable satellite orbits for link assignments in order for satellite nodes to multicast packets to destinations throughout all the planes of a multi-plane satellite constellation. Link assignments refer to the manner in which a point-to-point link connection between specific pairs of satellites within a network may be determined based on the satellite orbits in a multi-plane satellite constellation. If there are broken links, packets are re-routed to bypass the broken links since each node typically has available multiple links to route packets. Unless all links of a satellite node are broken, a routing path is generally determined to transmit packets to the destination. This is accomplished without using bandwidth consuming link-state overhead traffic required by other multicast protocols. In addition, the present invention enhances packet completion rates in environments with link failures.

OBJECTS AND SUMMARY OF THE INVENTION

Accordingly, it is an object of the present invention to determine a routing path for information packets within a multi-plane satellite network constellation.

It is another object of the present invention to determine a routing path for information packets within a multi-plane satellite network constellation by determining plane locations of the receiving members and the links that are employed to reach these members.

Yet another object of the present invention is to utilize an alternative routing path for information packets within a multi-plane satellite network constellation when the preferable routing path becomes disabled due to failures of inter-plane and/or intra-plane links within that routing path.

Still another object of the present invention is to enable routing in a multi-plane satellite network constellation without updated link-state routing information.

The aforesaid objects may be achieved individually and/or in combination, and it is not intended that the present invention be construed as requiring two or more of the objects to be combined unless expressly required by the claims attached hereto.

According to the present invention, a satellite network constellation employs a technique for multicasting packets through the network. The network comprises plural satellites in plural orbital planes with each satellite equipped with a plurality of high-speed point-to-point full duplex radio links for inter-satellite communications. A node intending to send a multicast packet to a multicast group or a set of destination satellite nodes initially sends the packet to the orbital planes that include the group members. Once reaching the plane, in-plane routing techniques are used to forward the packet to the intended group members. If there are broken or disabled links, an alternative path is taken to forward the packet without disrupting the functioning links.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Current satellite systems may contain constellations of satellites in multiple orbital planes. These systems require the ability to communicate the same data to multiple satellite nodes in a combined space/ground network. Examples of such systems include the Global Positioning System (GPS), Space Based Infra-Red System (SBIRS), and Galileo. These large satellite constellations may employ the present invention multicast distribution for a variety of situations. For example, multicasting may be employed when data is recorded by sensors resident on one satellite and this data needs to be distributed to the remaining satellites in the constellation or a sub-set of satellites in the constellation. Multicast distribution provides much more efficient crosslink bandwidth utilization than individual unicast distribution or flooding when large amounts of data are distributed.

Another example of the use of the multicast distribution in a combined space/ground network may occur when the ground segment distributes information to a subset of the entire satellite constellation. For example, the ground segment may desire every satellite in the constellation which is currently in view of a particular geographic location to transmit data to users on the ground at that location. In this case, the ground segment initially identifies which satellites are in view of the targeted geographic location. The ground segment subsequently sends a series of multicast packets to the satellite constellation addressed to the identified satellites. The data is distributed throughout the constellation in accordance with the present invention multicast described below. The application layer at each receiving satellite transmits the data to users on the ground at the desired geographic location. The use of crosslink bandwidth is minimized relative to other possible distribution techniques, such as individual unicast transmission or flooding.

Since satellites move in predictable orbits based on known Keplarian parameters, routing calculations for satellite networks are simplified. The present invention takes advantage of the predictable satellite orbits when determining link assignments to enable satellite nodes to multicast packets to destinations throughout all the planes of a multi-plane constellation. If there are broken links, packets are re-routed to bypass those links. Unless all the links of a satellite node are broken, a routing path is generally determined to transmit the packets to their intended destinations.

Figure 1A:
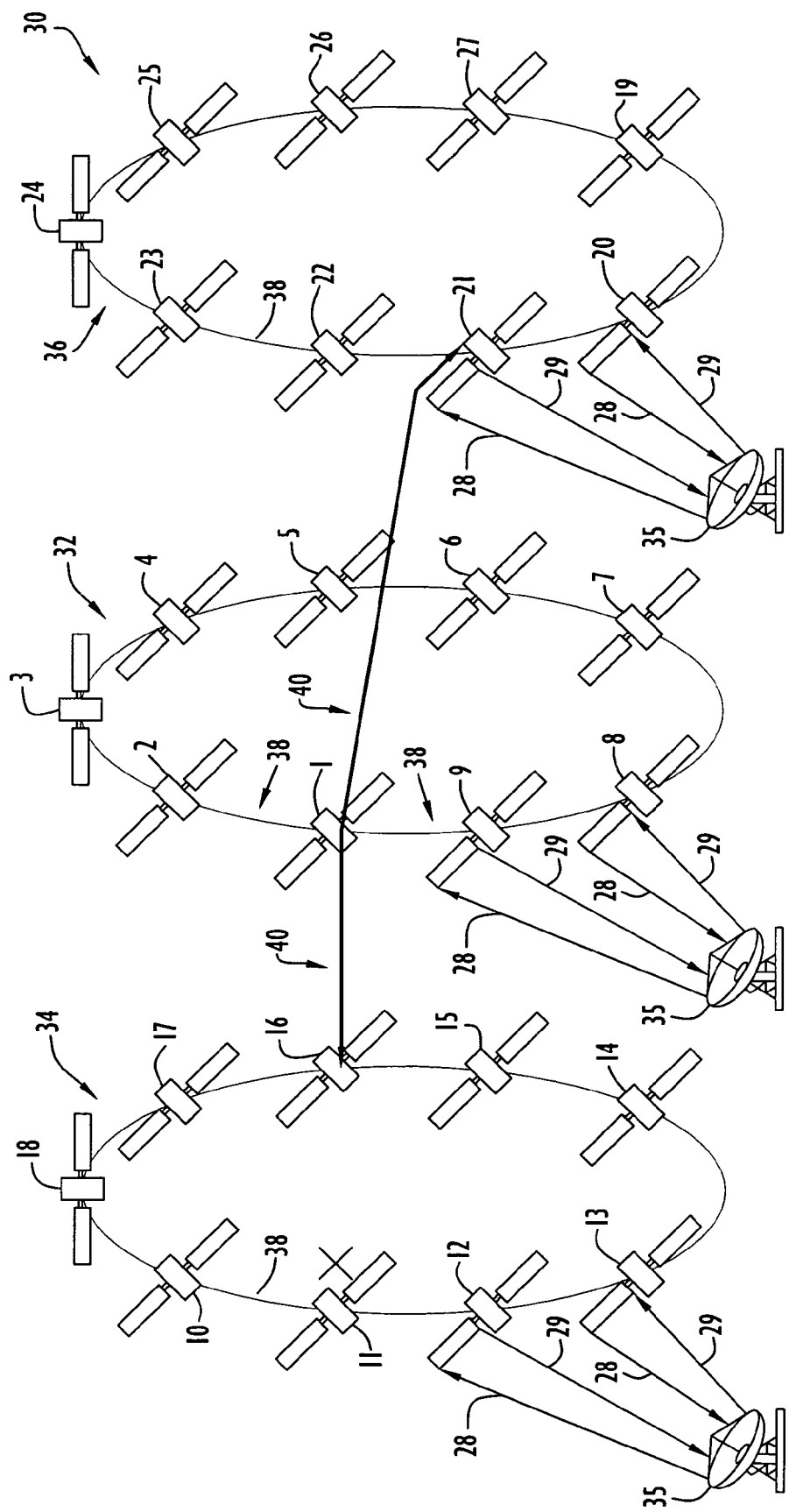
FIG. 1A is a diagrammatic illustration of an exemplary satellite communication network employing packet multicasts in accordance with the present invention.

An exemplary satellite constellation network 30 employing multicast distribution of packets according to the present invention is illustrated in FIG. 1A. Specifically, satellite constellation 30 includes a plurality of satellites or nodes arranged into orbital planes 32, 34 and 36 and one or more ground stations 35. By way of example only, constellation 30 includes satellites 1-27, with each plane including nine satellites. Orbital plane 32 includes satellites 1-9, while orbital plane 34 includes satellites 10-18. Orbital plane 36 includes satellites 19-27. The satellites and/or ground stations basically serve as network nodes to facilitate communications through the network.

Figure 1B:
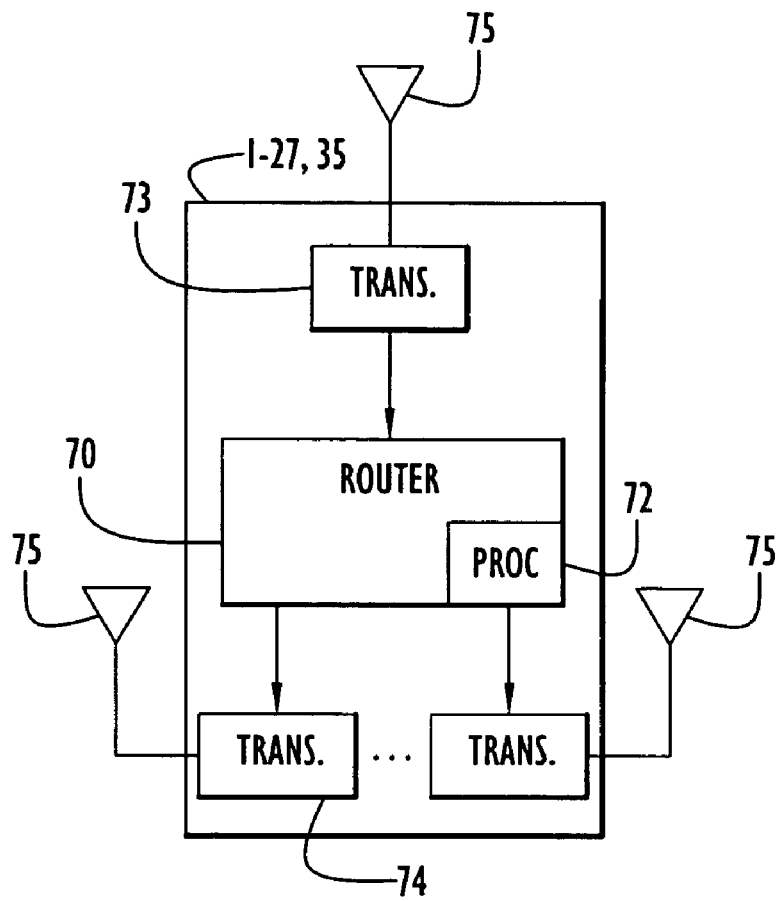
FIG. 1B is a block diagram of an exemplary satellite of the network of FIG. 1A.

Referring to FIG. 1B, the satellites and ground stations each include a router 70 that is interconnected with other network routers via point-to-point radio links (e.g., between satellite routers) or radio uplinks and downlinks (e.g., between satellite and ground station routers). Each satellite 1-27 includes a plurality of in-plane links 38 to communicate with other satellites within the same plane. Links 38 (e.g., forward and aft links as viewed in FIG. 1A) basically arrange the satellites within a plane in a ring topology and enable communication between a particular satellite and the immediately succeeding (e.g., forward link) and preceding (e.g., aft link) satellites within the plane. These links are usually always enabled during system operation. Cross-plane links 40 (e.g., inter-plane links as viewed in FIG. 1A) facilitate communications between satellites within different planes. These cross-plane links are selected based on distances between satellites as described below. The satellites further include one or more radio downlinks 28 to the ground stations, while the ground stations include one or more uplinks 29 to the satellites. The downlinks and uplinks are enabled when corresponding satellites are in position to have a line of sight (e.g., enable the existence of a communication path) with the ground station.

The satellite communication network may employ a link-state type of routing protocol to facilitate routing of information throughout the network. This may be accomplished by the ground stations and/or satellite nodes. Basically, each node (e.g., satellite and ground station) within the network maintains a routing database (not shown) including information enabling the node to determine an appropriate path for routing a packet. The information contained within the node databases typically relates to links (e.g., in-plane and cross-plane links, uplinks, downlinks, etc.) between the various network nodes, while routing information is typically maintained within a routing table. The link-state type routing protocol provides for synchronization of node databases through transmission of link-state advertisement (LSA) type or database update packets to each network node. These packets are conventionally transmitted to each neighboring network node via plural point-to-point messages (e.g., messages from a source node to a specific destination network node) in response to modifications to the network facilitating changes in a node database.

With respect to satellite constellation networks, these networks employ radio links over distances of tens of thousands of kilometers as described above. Thus, the time required to propagate the link state updates over the entire constellation network prevents the satellite nodes from determining alternative routing paths after a disabled link. The present invention basically enables routing in the network without updated link-state information (or knowledge of broken links within a routing path). This is accomplished by each satellite node bypassing broken links as described below. If link-state updates are employed within the network, the present invention enables routing in the network irrespective of the link state updates.

Router 70 (FIG. 1B) routes data packets throughout the network and facilitates communications. The router includes a processor 72 with various router modules or components, typically implemented by software modules, to perform communication functions including the multicast distribution of the present invention. Processor 72 is coupled to a transceiver 73 that receives data from satellite constellation network 30 via a corresponding antenna 75. The processor processes the received data and generates data for transference to transceivers 74, each respectively coupled to a corresponding antenna 75. The processor may be implemented by any conventional or other microprocessor, controller or processing system. However, the processor, router and/or modules may be implemented by any software and/or hardware modules in any combinations thereof. The router is coupled to radio transceivers 74 within each satellite to enable communications over links 38, 40 and downlinks 28 and uplinks 29 via corresponding antennas 75. Transceivers 74 typically encrypt, modulate and transmit signals from a corresponding satellite, while transceiver 73 receives signals from other satellites or the ground station. The transceivers may be implemented by any conventional or other transmitting and receiving devices. The ground station includes a router substantially similar to the router described above, where the ground station router is coupled to radio transceivers (not shown) within the ground station to enable communications over downlinks 28 and uplinks 29. The transceivers typically encrypt, modulate and transmit signals from the ground station and receive signals from the satellites in substantially the same manner described above.

Each satellite 1-27 includes in-plane links 38 and cross-plane links 40 as described above. The communication frequency and antenna beam width of satellite transmissions are selected to enable existence of point-to-point links between any two satellites in constellation network 30. By way of example only, each satellite 1-27 is designed to have four links that include two in-plane links 38 and two cross-plane links 40. The in-plane links and cross-plane links are distributed in the desired fashion within the network. Links 38 are employed for in-plane communication, where each link enables communication with a neighboring satellite within the plane (e.g., one link establishes communication with a succeeding plane satellite, while the other link establishes communication with a preceding plane satellite). Links 40 are used for cross-plane communication, where each link enables communication with a corresponding satellite in an adjacent plane. In order to accommodate full-duplex communication within the network, each link is assigned two frequencies, one for transmission and one for reception, thereby providing a total of eight unique frequencies (e.g., two frequencies for each of the two in-plane links and each of the two cross-plane links) for each satellite 1-27. The multicast distribution of the present invention is described in terms of a satellite or node that employs these four links. However, the present invention may employ any quantity of any types of satellite links. The present invention adapts to find an alternative path in response to a broken or disabled link. If a satellite has no links, the satellite is isolated with no communication capability.

Each satellite selects the two links to fore and aft in-plane satellite neighbors as in-plane links 38 as described above. These neighbors are always visible to the corresponding satellite. Since the distance from a satellite to the fore and aft in-plane neighbors is typically the shortest, propagation delay is minimized. Cross-plane link selection is complex due to the distance between satellites within adjacent planes varying with time and the changing visibility between the adjacent plane satellites. However, the satellites of network 30 have periodic orbits with known orbital periods. Accordingly, the position and velocity of each satellite, at any given time, is a known quantity. Thus, the network can determine the best candidates for cross-plane links based on the known information. The cross-plane link selection should minimize the total average propagation delay from any satellite to any other satellite within the constellation and render cross-plane links fixed and visible.

A manner of selecting cross-plane links according to the present invention is described. Specifically, let N be the total number of satellites in the constellation. Each source satellite determines its range with the rest of N−1 destination satellites every Δt seconds (e.g., typical value of Δt is one minute). Destination satellites that are not always visible are eliminated from consideration, thereby providing M destinations. Visibility between satellites is determined from the known position and velocity of each network satellite. To each destination, j, the following average distance, $D_j$, is computed as follows:

$$D_j = \frac{1}{C}\sum_{k=0}^{C-1} d_j(k\Delta t) \quad j = 1, M$$

where C=(T)/Δt, T is the orbital period of the source satellite and $d_j$ is the distance to the jth satellite at successive Δt intervals. The M distance values (e.g., $D_1$-$D_M$) are ranked. The two destinations within different adjacent planes that have the smallest distances from the source satellite are determined, where the links between the source satellite and those destinations are selected as the two cross-plane link candidates for the source satellite. The link assignments for each satellite cross-plane link can be determined in advance due to the known periodic satellite orbits.

Each satellite node monitors corresponding in-plane and cross-plane neighbors to determine the presence of broken in-plane and cross-plane links. This is accomplished by periodically transmitting HELLO type messages to neighboring satellite nodes. The HELLO message includes a field with a single bit flag. The flag is set (e.g., the bit value is one) in response to receiving a transmission from the neighbor, otherwise the flag contains a zero value. This enables a satellite node to determine the presence of a uni-directional or bi-directional link. A node avoids using a uni-directional link to transmit data because uni-directional links are considered volatile. A HELLO message is not transmitted if there has been data transmission within a pre-determined time period in order to save overhead HELLO transmission. If a node has not heard from its neighbor within a predetermined quantity of HELLO intervals, T, or the received HELLO message indicates a uni-directional link, the corresponding link is considered broken. By way of example only, a satellite waits for three HELLO intervals, 3T, to receive a HELLO message before considering a link broken. A route is repaired locally in response to a broken link by employing an alternative path to forward the packet as described below.

The number of multicast destination groups and members within each multicast group are preferably predefined and uploaded to constellation 30 from ground stations 35 (FIG. 1A). Further, since the orbits of the satellite nodes are periodic and known, routing and alternative routing paths for each satellite node within the network are determined in advance by ground stations 35. The ground stations produce a routing table (e.g., including routing paths for each of the satellites in their various orbital positions) that is uploaded to each satellite node to enable routing of the multicast packets between any satellite nodes in the network. The present invention enables routing in the absence of updated routing table information. The routing table updates should be minimized to reduce network overhead, where the present invention enables routing table updates to be eliminated or significantly reduced. For example, routing table updates may be performed infrequently, either periodically or in response to various conditions (e.g., a quantity of broken links exceeding a threshold, etc.).

The multicast group members are typically distributed among the orbital planes, while each satellite includes complete knowledge of all multicast groups. By way of example only, there are L satellites in each plane with each satellite including two in-plane links 38 (FIG. 1A) as described above. The in-plane links provide two simultaneous transmission paths within the plane including clockwise and counter-clockwise directions. For example, a source satellite 1 (FIG. 1A) in plane 32 may transmit packets in one path through satellites 1,2,3,4 and 5 and in another path through satellites 1,9,8,7 and 6. For each in-plane link, source satellite 1 knows which satellites can be reached (e.g., source satellite 1 can reach satellites 2,3,4 and 5 via one clockwise in-plane link and can reach satellites 6,7,8 and 9 via another counter-clockwise in-plane link). Thus, packet transmissions along the clockwise and counter-clockwise in-plane links utilize at most (L−1)/2 hops or satellites to reach all the satellites in the same plane (e.g., since each direction includes approximately one-half of the satellites in the plane). In addition, the source satellite includes two cross-plane links 40 (FIG. 1A) that each reach a corresponding satellite within a different plane as described above. The source satellite includes complete knowledge of the satellites in other planes. For example, source satellite 1 (FIG. 1A) knows satellites 10-18 reside in plane 34 and satellites 19-27 reside in plane 36.

Figure 2B:
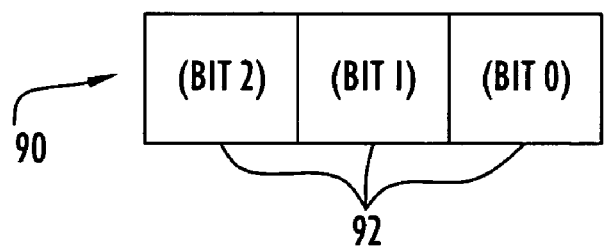
FIG. 2B is a diagrammatic illustration of a plane list field within a multicast packet indicating destination planes for the packet in accordance with the present invention.
Figure 2A:
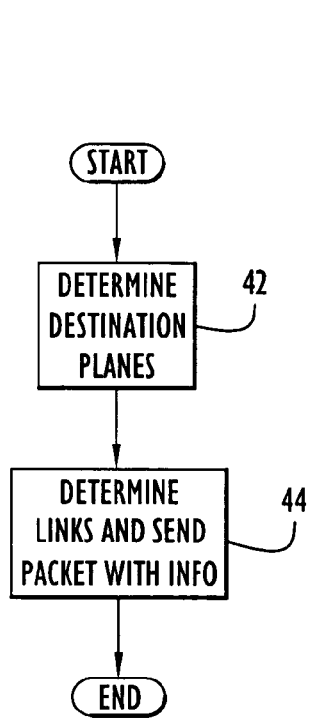
FIG. 2A is a procedural flow chart illustrating the manner in which a source node of a satellite communication network multicasts packets through that network according to the present invention.

The manner in which a source satellite node multicasts packets according to the present invention is illustrated in FIG. 2A. Specifically, when a source satellite desires to send a multicast packet to a given group of satellites, the source satellite initially determines the planes on which the group members reside at step 42. This is accomplished based on the source satellite knowledge of satellites in the other planes as described above. The source satellite utilizes the routing table to determine appropriate paths for the packet to the in-plane destination satellite nodes, determines the source satellite in-plane links to be used for transmission of the packet in accordance with the routing paths, and transmits the packet along the links at step 44. Basically, if the destination satellites or group members include satellites within the same plane as the source satellite, the source satellite determines the routing paths and required source satellite in-plane links to reach those in-plane group members, where a plurality of in-plane (e.g., clockwise and counter-clockwise) links may be utilized.

When the multicast group includes cross-plane members, the source satellite determines the planes within which the members reside, the corresponding satellites within those planes, appropriate routing paths for the packet to the cross-plane destination satellite nodes based on the routing table, and the source satellite links to be used for transmission in accordance with the routing paths. The source satellite subsequently transmits the multicast packet to each of those planes via the determined links. Once the packet reaches the other planes, the packet is forwarded to the group members within those planes via the in-plane techniques described above. A packet cannot be forwarded on the same link from which the packet was received. If no valid links are available, the packet is discarded. The manner in which the routing paths and links are determined to multicast a packet to the destination satellite nodes while bypassing broken links is described below with reference to FIG. 3.

The source satellite (and each satellite forwarding a multicast packet) places or piggybacks a plurality of fields into each multicast packet including a plane list 90, a hop count and a multicast member or destination list. Referring to FIG. 2B, plane list 90 includes fields 92 representing the destination planes for a multicast. Each field 92 is associated with a corresponding plane of the network and includes a bit serving as a flag for the corresponding plane. A bit value of one indicates that the packet is to be forwarded to the corresponding plane, while a bit value of zero indicates that the corresponding plane is not an intended destination. By way of example only and with reference to network 30 (FIG. 1A), plane list 90 includes three fields or bits 92 (e.g., bit 0, bit 1 and bit 2 as viewed in FIG. 2B) with each bit associated with a corresponding plane 32, 34, 36 (e.g., bit 0 is associated with plane 32, bit 1 is associated with plane 34 and bit 2 is associated with plane 36). If a packet is to be transferred to plane 36, plane list 90 includes zero values for bits 0,1 and a one value for bit 2. The hop count indicates the maximum number of hops or satellites through which the packet may be transmitted, while the multicast member list indicates the multicast group members or network satellites to receive the packet. The hop count (or quantity of satellite nodes traversed by a packet to reach a destination) is typically initialized to (L−1)/2 for in-plane transmissions (e.g., the quantity of satellites, L, in the plane less the source or forwarding satellite, where the quantity is divided by two since each in-plane link direction accommodates approximately one-half of the plane satellites), and to (L+1)/2 for cross-plane transmissions (e.g., the quantity of satellites, L, in the cross-plane plus the source or forwarding satellite, where the quantity is divided by two since each in-plane link direction of the cross-plane accommodates approximately one-half of the satellites in the cross-plane). The hop count value is determined based on integer operations, where the resulting value is rounded to an integer value. The hop count is decreased by one at each hop or satellite traversed by the packet.

Figure 2C:
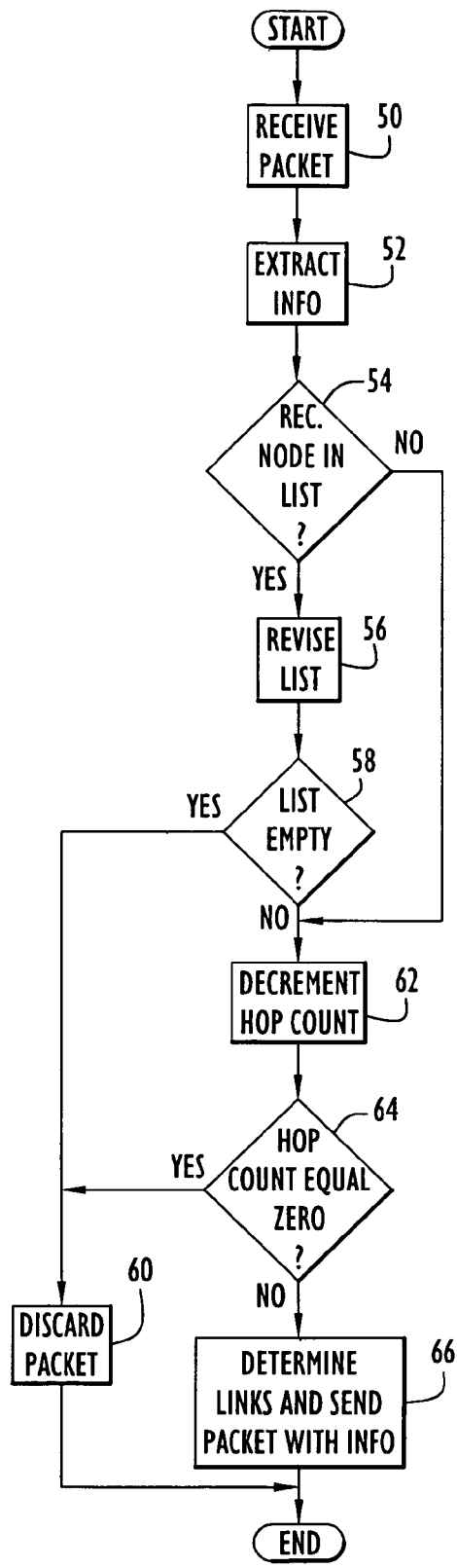
FIG. 2C is a procedural flow chart illustrating the manner in which received multicast packets are processed and forwarded by a satellite communication network node according to the present invention.

The manner in which a satellite node receives and processes a multicast packet is illustrated in FIG. 2C. Initially, a source satellite transmits a multicast packet as described above. A satellite node within the routing path receives the packet at step 50. The multicast packet includes plane list 90, a hop count and the multicast group member list as described above. The satellite node receiving the packet initially extracts a group address and the multicast or destination member list at step 52. If the receiving satellite node is in the multicast member list as determined at step 54, the packet is received and processed by the receiving satellite node, while the receiving satellite node is removed from the multicast member list at step 56. When the revised multicast member list contains no additional members as determined at step 58, the packet is discarded at step 60.

When the multicast member list contains additional members as determined at step 58 or the receiving satellite node is absent from the multicast member list as determined at step 54, the hop count is decremented at step 62. If the hop count equals zero as determined at step 64, the packet is discarded at step 60. When the hop count does not equal zero (e.g., indicating the packet is to traverse further satellite nodes), the receiving satellite node determines an appropriate routing path for forwarding the packet to the next hop based on the routing table, further determines the receiving node links to be used for forwarding the packet to that next hop in accordance with the routing path, and transmits the packet along those links at step 66. The multicast member list (or revised list in the case where the receiving satellite node is present within the list) is placed or piggybacked into the packet (along with the plane list and hop count as described above), where the packet is forwarded to the next hop or node. A packet cannot be forwarded on the same link from which the packet was received. If no valid links are available for forwarding, the packet is discarded. The manner in which the routing paths and links are determined to multicast a packet to the destination satellite nodes while bypassing broken links is described below with reference to FIG. 3.

Figure 3:
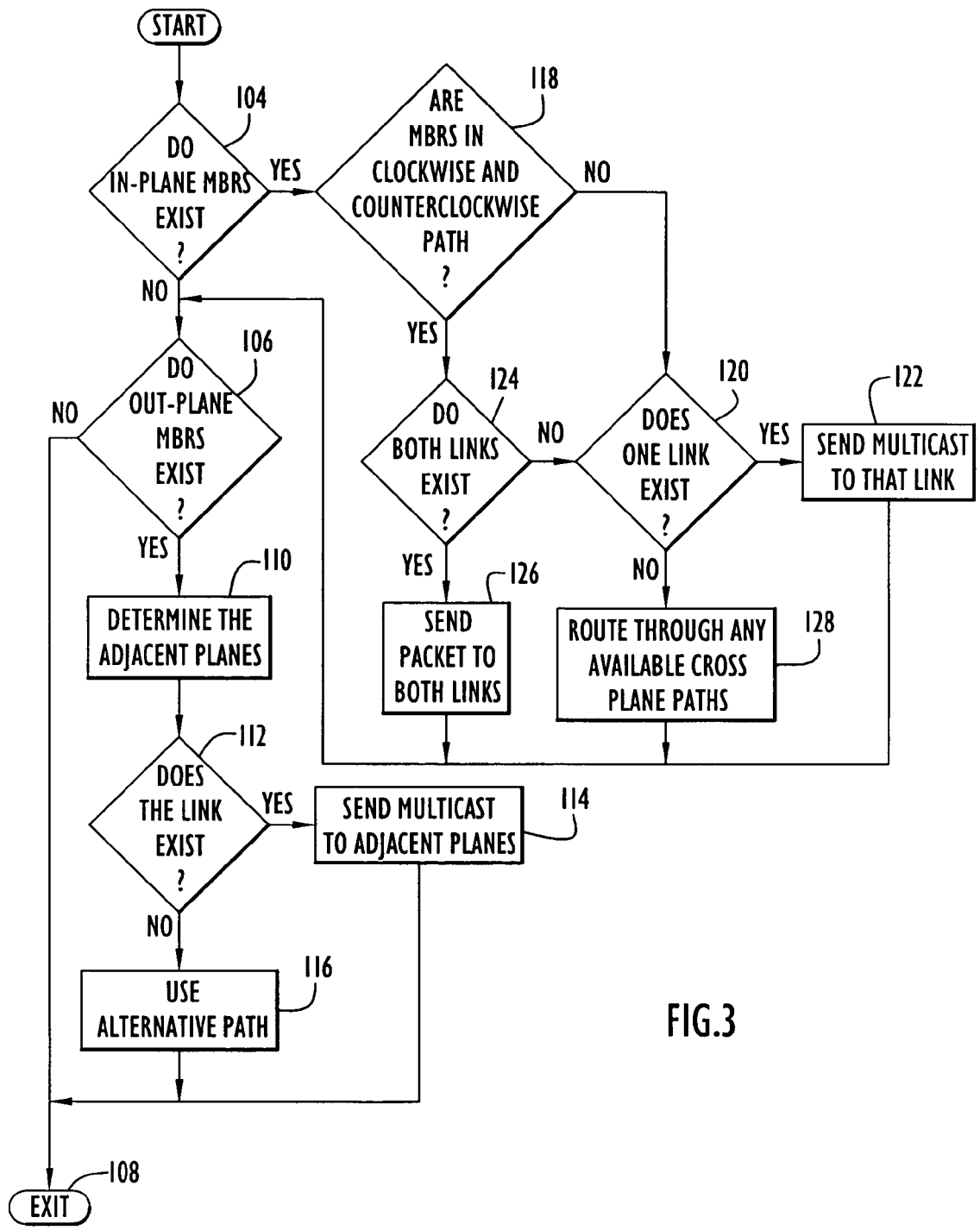
FIG. 3 is a procedural flow chart illustrating the manner in which a satellite communication network node routes and transmits or forwards a multicast packet through that network according to the present invention.

The present invention enables satellite network nodes to route multicast packets through the network while bypassing broken links in a packet routing or transmission path without updated link-state information. Initially, source satellite nodes determine routing paths and links for transmission of multicast packets (e.g., FIG. 2A, step 44), while satellite nodes receiving a multicast packet similarly determine routing paths and links to forward that packet (e.g., FIG. 2C, step 66) as described above. The manner in which satellite network nodes (e.g., source and receiving) route and transmit packets to enable a multicast packet to traverse the network to the destination satellite nodes while bypassing broken links according to the present invention is illustrated in FIG. 3. Specifically, when a packet is available for transmission or forwarding at a satellite node, the transmitting satellite node determines if the destination satellites or group members include satellites within the same plane as the transmitting satellite node at step 104. If group members exist in the same plane, the transmitting satellite node determines the presence of group members in clockwise and counter-clockwise in-plane paths at step 118. When group members reside in both the clockwise and counter-clockwise paths, the transmitting satellite node determines appropriate paths to the in-plane destination satellite nodes based on the routing table and further determines the required transmitting satellite node links to reach those in-plane group members in accordance with the routing paths, where a plurality of in-plane (e.g., clockwise and counter-clockwise) links may be utilized. If each in-plane link 38 (FIG. 1A) of the transmitting satellite node is enabled (e.g., both links exist) as determined at step 124, a packet is transmitted on both links in accordance with the corresponding routing paths at step 126. An example of a multicast transmission according to the present invention in the absence of broken links within the network is described below with reference to FIG. 4.

The transmitting satellite node places the hop count, plane list and destination satellites within each transmitted packet. The destination satellites within each transmitted packet include the group member satellites residing in the corresponding path direction of the link (e.g., clockwise or counter-clockwise). In other words, the destination satellite list for the packet traversing the clockwise link includes the destination satellites residing in the clockwise path, while the destination list for the packet traversing the counter-clockwise path includes the destination satellites residing in the counter-clockwise path. The hop count is initialized to (L−1)/2, while the plane list includes a value of one for the field corresponding to the transmitting satellite plane, while fields for the other planes are set to zero values.

If group members reside in only one of the clockwise or counter-clockwise path directions as determined at step 118, the transmitting satellite node determines appropriate paths to the in-plane destination satellite nodes based on the routing table and further determines the required transmitting node links to reach those in-plane group members in accordance with the routing paths. When an in-plane link exists in the corresponding direction for the transmitting satellite node as determined at step 120, the packet is multicast along the routing path via the existing link at step 122 in the manner described above. The transmitting satellite places the appropriate information (e.g., plane list, destination list and hop count) within the packet for transmission along the link.

In the case of a broken in-plane link of the transmitting satellite node, the routing table is utilized to determine an alternative path for the packet to the in-plane destination satellite nodes. In particular, if group members reside in both of the clockwise and counter-clockwise path directions as determined at step 118, the transmitting satellite node determines appropriate paths to the in-plane destination satellite nodes based on the routing table and further determines the required transmitting satellite node links to reach those in-plane group members in accordance with the routing paths. When one of the transmitting satellite in-plane links utilized within a routing path is broken or disabled as determined at steps 120, 124, the transmitting satellite determines an alternative routing path based on the routing table and the packet is transmitted along the alternative routing path via the enabled in-plane link at step 122. The alternative routing path may be selected based on various factors (e.g., link quality, range, received signal strength, transmission power, etc.). Since one link is utilized, the hop count is initialized to L−1 (e.g., the quantity of satellite nodes in the plane less the transmitting satellite node). Alternatively, the transmitting satellite node may determine alternative routing paths and utilize one or more of the remaining enabled links (e.g., in-plane, cross-plane, etc.) for transmission of the multicast packet to enhance the probability of reception. In this case, duplicate packets received at a satellite node are discarded. An example of a multicast transmission according to the present invention in the presence of broken in-plane links in the network is described below with reference to FIG. 5.

If no in-plane links of the transmitting satellite node are available to reach in-plane (e.g., clockwise and/or counter-clockwise) member nodes as determined at steps 120, 124, the packet is routed through cross-plane links to an adjacent plane for subsequent transmission back to the desired plane to bypass the broken links at step 128. The transmitting satellite node utilizes the routing table to determine an alternative path for the packet through an adjacent plane to the in-plane destination satellite nodes in the case of disabled transmitting satellite in-plane links. The alternative routing path may be selected based on various factors, while alternative routing paths may be determined for utilization of one or more of the remaining enabled links to enhance the probability of reception as described above. The transmitting satellite node determines the required links and transmits the packet over the those links to the adjacent plane. The transmitting satellite plane members are included within the member lists for the cross-plane packets to enable routing back to that plane. In this fashion, satellite nodes in the adjacent plane are informed that the packet is to be transmitted back to the transmitting satellite plane. The hop count is preferably set to the sum of the quantities of in-plane and cross-plane hops (e.g., $(L-1)/2+(L+1)/2=L$). An example of a multicast transmission according to the present invention in the presence of no available in-plane links for a satellite node within the network is described below with reference to FIG. 6.

When no in-plane members exist as determined at step 104 or packets have been transmitted to existing in-plane members via steps 122, 126, 128, the transmitting satellite node determines the existence of out-plane or cross-plane multicast group members at step 106. If no cross-plane members exist, the process terminates at step 108. However, when the multicast group includes cross-plane members, the transmitting satellite node determines the planes within which the members reside and the corresponding satellites within those planes at step 110. The transmitting satellite node utilizes the routing table to determine appropriate paths for the packet to the cross-plane destination satellite nodes and further determines the required transmitting satellite node links to reach those cross-plane group members in accordance with the routing paths. When cross-plane links 40 of the transmitting satellite node are available to reach each of the destination planes as determined at step 112, the multicast packet is transmitted to each of the planes in accordance with the routing paths using the corresponding cross-plane links at step 114. The packet is piggybacked with a hop count of $(L+1)/2$, the plane list with a value of one in the corresponding destination plane field and the group members that are in that plane. Once the packet reaches the cross planes, the packet is forwarded to the group members within those planes using the in-plane techniques discussed above. An example of a multicast transmission according to the present invention in the absence of broken links within the network is described below with reference to FIG. 4.

If a transmitting satellite node cross-plane link to a destination plane is broken, the routing table is utilized to determine an alternative path for transmission of the packet to the cross-plane destination satellite nodes at step 116. Once the packet has been transmitted to the group members, the process terminates at step 108. In particular, the transmitting satellite node utilizes the routing table to determine an alternative path for the packet to the cross-plane destination satellite nodes in the case of disabled transmitting satellite node cross-plane links. The alternative routing path may be selected based on various factors, while alternative routing paths may be determined for utilization of one or more of the remaining enabled links to enhance the probability of reception as described above.

The alternative routing paths are selected based on the availability of the remaining transmitting satellite node links.

For example, if one or more cross-plane links are disabled, the alternative routing path may utilize cross-plane links of in-plane satellite nodes to route the packet to the destination plane. In this case, the transmitting satellite node determines in-plane links to reach the in-plane satellite nodes and transmits the packet via those links. Group members from both planes are included in the packet in response to group members being from both the transmitting and destination planes. When the in-plane nodes determine the presence of cross-plane nodes in the packet, the packet is forwarded to the adjacent plane via cross-plane links associated with that node. Once the packet reaches the cross plane, the packet is forwarded to the group members within that plane using the in-plane techniques discussed above.

Further, the alternative routing path may utilize the remaining cross-plane link to route the packet to the destination plane via an adjacent plane. In this case, the transmitting satellite node transmits the packet to the adjacent plane via the enabled cross-plane link. Group members from both the destination and adjacent planes are included in the packet in response to group members being from both of those planes. When the adjacent plane node determines the presence of cross-plane nodes in the packet, the packet is forwarded to the destination plane via cross-plane links associated with that node. Once the packet reaches the cross plane, the packet is forwarded to the group members within that plane using the in-plane techniques discussed above. An example of a multicast transmission according to the present invention in the presence of broken cross-plane links is described below with reference to FIGS. 7 and 8.

Each satellite receiving the packet from the transmitting satellite node processes that packet in the manner described above for FIGS. 2C and 3. Since the satellites may not transmit on the same link upon which a packet is received, the receiving satellite nodes forward the packet through the network. When the destination list is empty, the hop count is zero or a packet cannot be forwarded due to link (e.g., in-plane and cross-plane) unavailability, the packet is discarded. Thus, each satellite node (e.g., source or receiving satellite node) determines a routing path for a packet based on the routing table. When no links are broken or disabled along an initial routing path (e.g., determined by the source satellite), the receiving satellite nodes forward the packet along that initial path which is ascertained by each satellite node via the routing table. If a receiving node encounters a disabled or broken link, an alternative routing path is determined by that node from the routing table and utilized. In other words, the packet traverses the network via the initial routing path (e.g., determined by the source satellite) in response to no broken links and utilizes alternative routing paths in response to the presence of broken links within the initial or subsequent routing paths (even though the routing table information may not reflect the current state of the network and/or the transmitting satellite is unaware of the broken links within the determined routing path).

Figure 4:
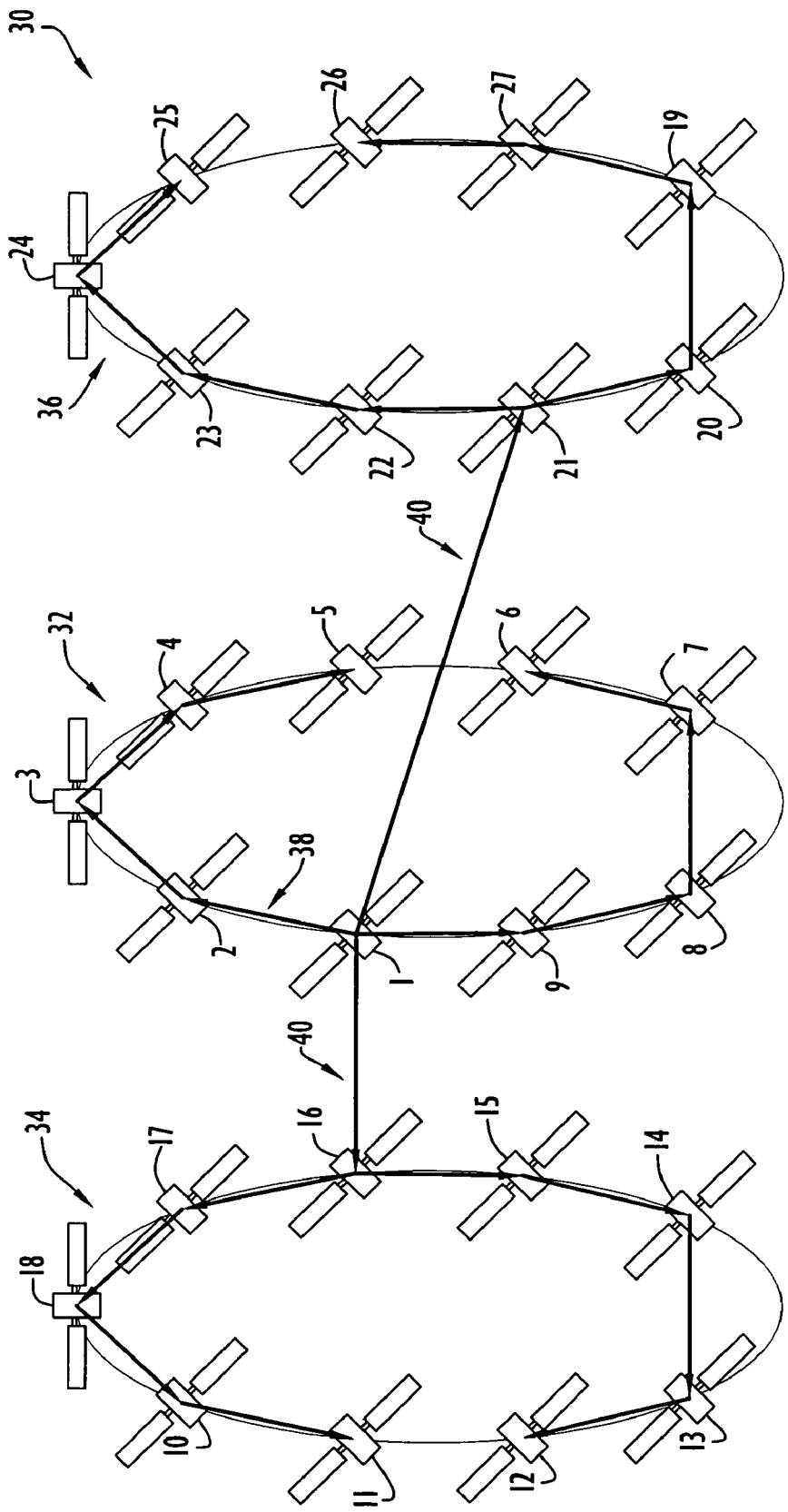
FIG. 4 is a diagrammatic illustration of an exemplary satellite communication network employing packet multicasts in the absence of broken links according to the present invention.

An example of a multicast transmission according to the present invention in the absence of broken links within the network illustrated in FIG. 4. Specifically, network 30 is substantially similar to the network described above. Source satellite 1 is to send a multicast packet to a multicast destination group that includes satellites 4,5,9 and 18. Source satellite 1 determines that satellites 4,5,9 belong to plane 32 and that satellite 18 belongs to plane 34. The source satellite further determines that satellites 4 and 5 are located in the clockwise path and that satellite 9 is in the counter-clockwise path. Source satellite 1 transmits two in-plane packets and one cross-plane packet. One in-plane packet follows the clockwise path through satellites 1, 2, 3, 4 and 5 with a group member list containing satellites 4 and 5 and a maximum hop count of four (e.g., $(L-1)/2=(9-1)/2=4$). The flag for plane 32 within the plane list is one, while the flags for planes 34, 36 are set to zero. The other in-plane packet follows the counter-clockwise path through satellites 1 and 9 with a group member list containing satellite 9 and a maximum hop count of four. The cross-plane packet follows the path through satellites 1, 16, 17 and 18 with a group member list containing satellite 18 and a maximum hop count of five (e.g., $(L+1)/2=(9+1)/2=5$). The flag for plane 34 within the plane list is set to one, while the flags for planes 32, 36 are set to zero. When satellite 16 receives the packet, the packet is forwarded to satellite 18 via the path through satellites 16, 17, 18.

Each time a satellite node receives the packet, the hop count is decremented by one. When the packet reaches satellite 18, the member list is zero, thereby enabling the packet to be discarded. For the in-plane packets, the packet stops at satellite 5 in the clockwise path due to a zero hop count and stops in the counter-clockwise path at satellite 9 because of an empty member list.

Figure 5:
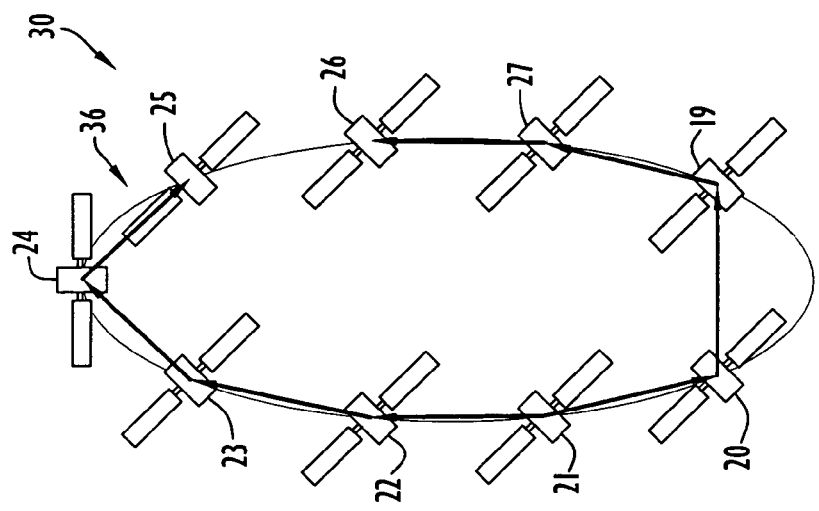
FIG. 5 is a diagrammatic illustration of an exemplary satellite communication network employing packet multicasts in the presence of a broken in-plane link according to the present invention.
Figure 5:
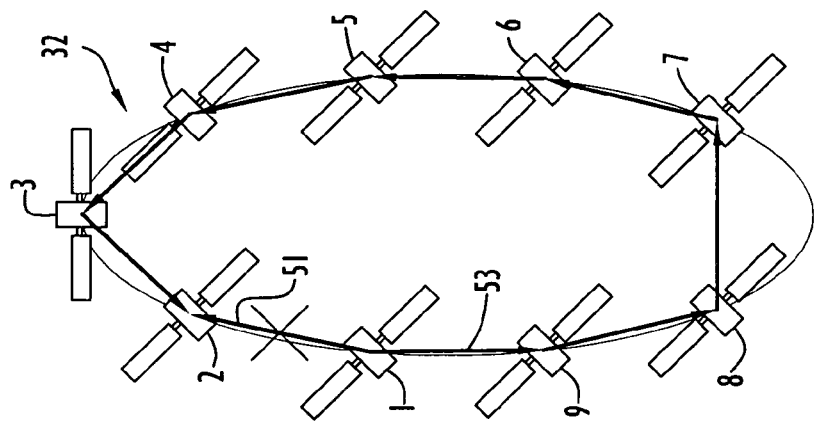
Figure 5:
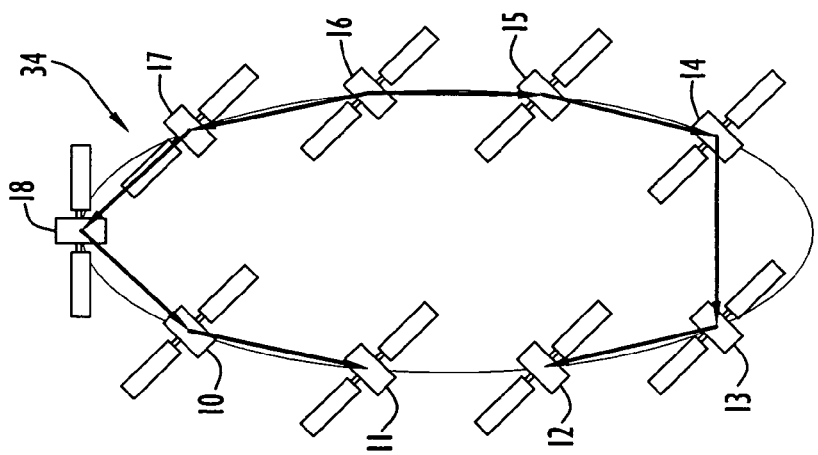

An example of a multicast transmission according to the present invention in the presence of broken in-plane links in the network is illustrated in FIG. 5. Initially, network 30 is substantially similar to the network described above. Source satellite 1 is to send a multicast packet to in-plane members, where in-plane link 51 (e.g., between satellites 1 and 2) in the clockwise path is broken. In this case, the routing function employs in-plane link 53 (e.g., between satellites 1 and 9) in the counter-clockwise direction to reach all the other nodes in the plane. In other words, if link 51 is broken, satellite 1 employs link 53 in the path through satellites 1, 9, 8, 7, 6, 5, 4, 3 and 2 to reach all the group members of plane 32. The hop count is set to L−1 to account for the longer path, since only one link was used.

Figure 6:
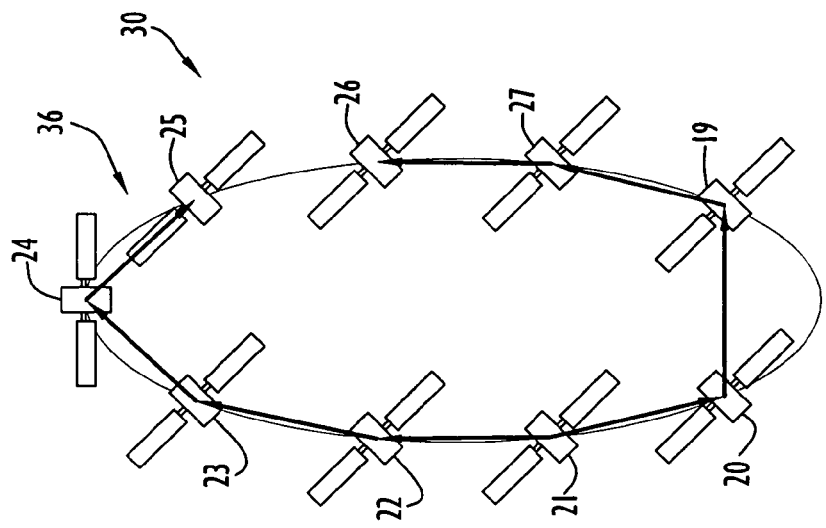
FIG. 6 is a diagrammatic illustration of an exemplary satellite communication network employing packet multicasts in the presence of a plurality of broken in-plane links according to the present invention.
Figure 6:
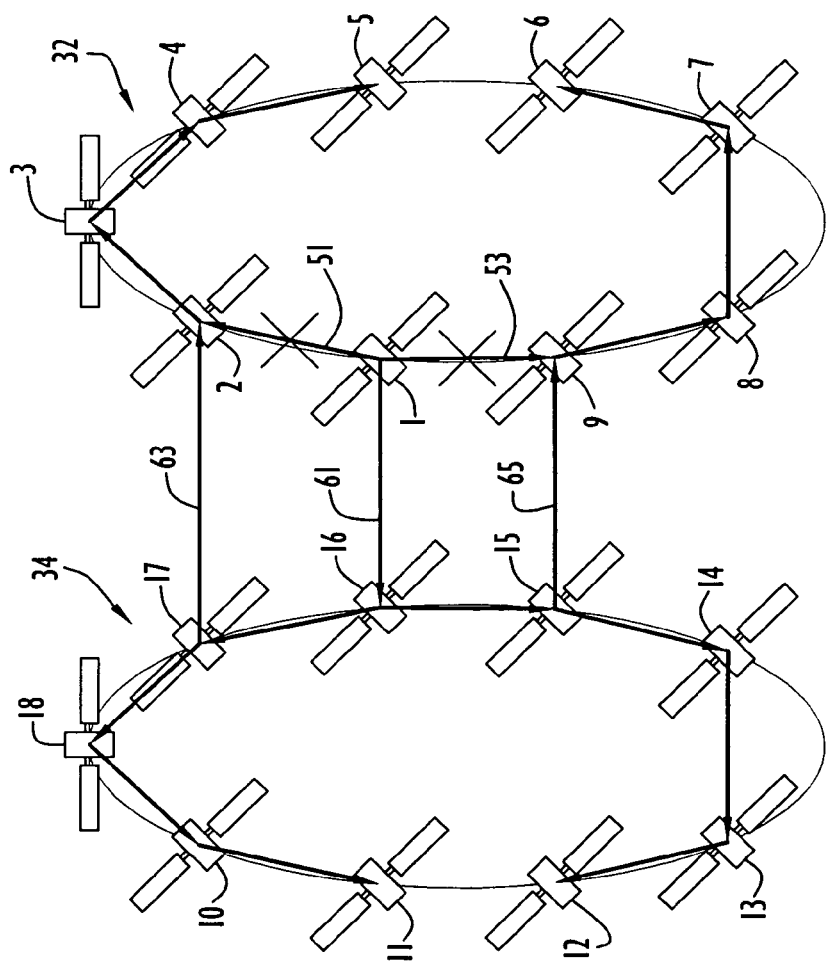

However, if source satellite in-plane links 51, 53 in both the clockwise and counter-clockwise directions are broken, satellite 1 initially employs a cross-link to bypass the broken links as illustrated, by way of example only, in FIG. 6. Initially, network 30 is substantially similar to the network described above. Source satellite 1 is to send a multicast packet to in-plane members or satellites 4 and 8, where in-plane link 51 (e.g., between satellites 1 and 2) in the clockwise direction and in-plane link 53 (e.g., between satellites 1 and 9) in the counter-clockwise direction are both broken. Satellite 1 sends the packet over a cross-plane link 61 to reach satellite 16 in plane 34 with a group member list containing satellites 4 and 8, and the flag set for plane 32 within the plane list. The hop count is set to the sum of the in-plane links or hops and the cross-plane links or hops or to $(L-1)/2+(L+1)/2=L$. Satellite 16 determines that there are multicast members from the source plane, thereby indicating link problems in that plane. Since satellite 16 cannot use cross-plane link 61 to transmit back to plane 32 as described above, satellite 16 forwards the packet to satellite 15 and satellite 17. Satellites 17 and 15 determine that the flag for plane 32 is set and that there are group members within plane 32 in the packet and proceed to forward the packet to satellites 2 and 9 in plane 32 via cross-plane links 63 and 65, respectively. The flag for plane 32 within the plane list is set in each of the packets. When satellites 2 and 9 receive the packet, the packet is forwarded using in-plane paths. The packet is discarded at satellite 4 and satellite 8 since the member list is empty upon reaching those nodes.

Figure 7:
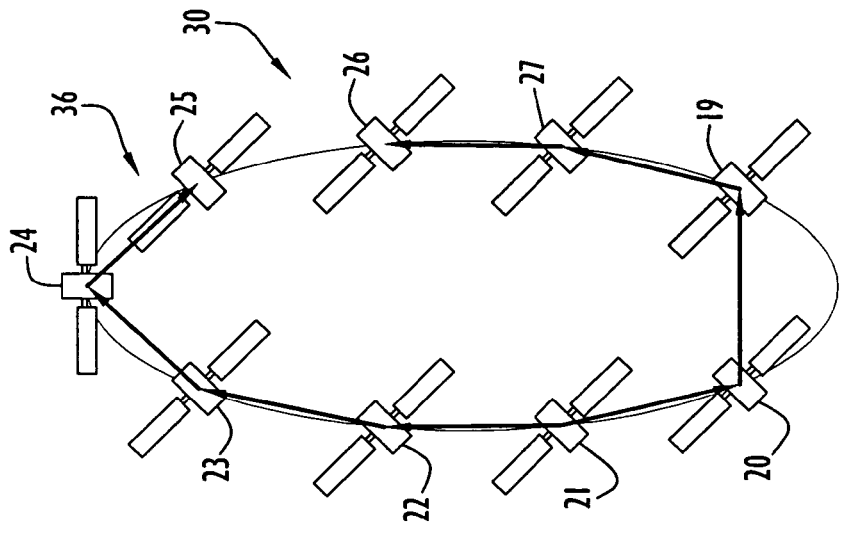
FIG. 7 is a diagrammatic illustration of an exemplary satellite communication network employing packet multicasts in the presence of a broken cross-plane link according to the present invention.
Figure 7:
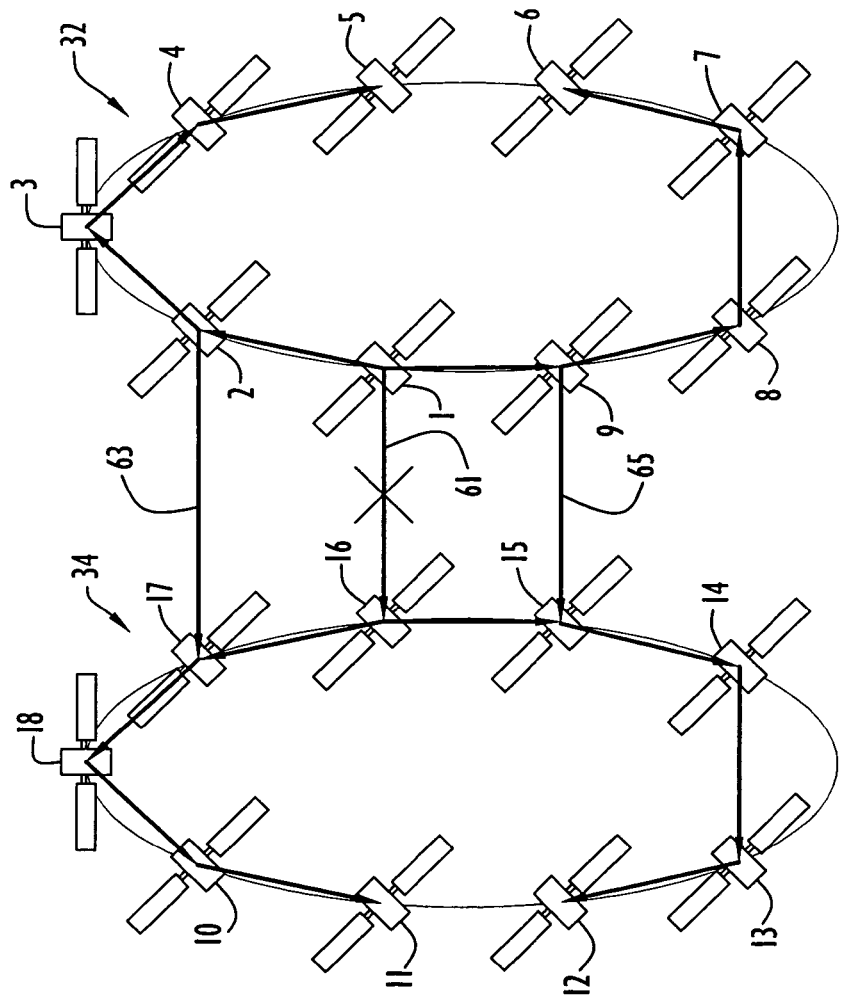

An example of a multicast transmission according to the present invention in the presence of broken cross-plane links is illustrated in FIG. 7. Initially, network 30 is substantially similar to the network described above. Source satellite 1 is to send a packet to cross-plane members 10 and 13, where cross-plane link 61 (e.g., between satellites 1 and 16) is broken. The source satellite initially utilizes in-plane paths to reach adjacent in-plane nodes with cross-plane links. Group members from both planes are included in the packet if there are group members from both the source plane and the destination plane. When the adjacent node determines the presence of cross-plane nodes in the packet, the packet is forwarded to the cross plane.

In particular, source satellite 1 transmits the packet using in-plane links to satellites 2 and 9. The packet includes a group member list containing satellites 10 and 13 from plane 34 with a hop count of nine and the flag set for plane 34 within the plane list. Satellites 2 and 9 detect group members 10 and 13 from plane 34 in the packet and forward the packet via cross-plane links 63 and 65 to satellites 17 and 15, respectively, with the flag for plane 34 set. Satellites 15 and 17 employ clockwise and/or counter-clockwise paths to reach group members 10 and 13 in plane 34.

When there are a plurality of links broken, the present invention techniques can be repeated to bypass the broken links and reach the desired destination. Initially, the plane containing multicast group members is reached. Once the destination plane is reached, the in-plane routing technique is used to forward the multicast packets to destination nodes. The in-plane links typically have priority; however, if these links are broken, the cross-plane links are used to transmit the packets. If all the links are broken, the packet is discarded. This provides several advantages. In particular, no link assignments are disrupted, and each node uses existing functioning links to forward multicast packets.

Figure 8:
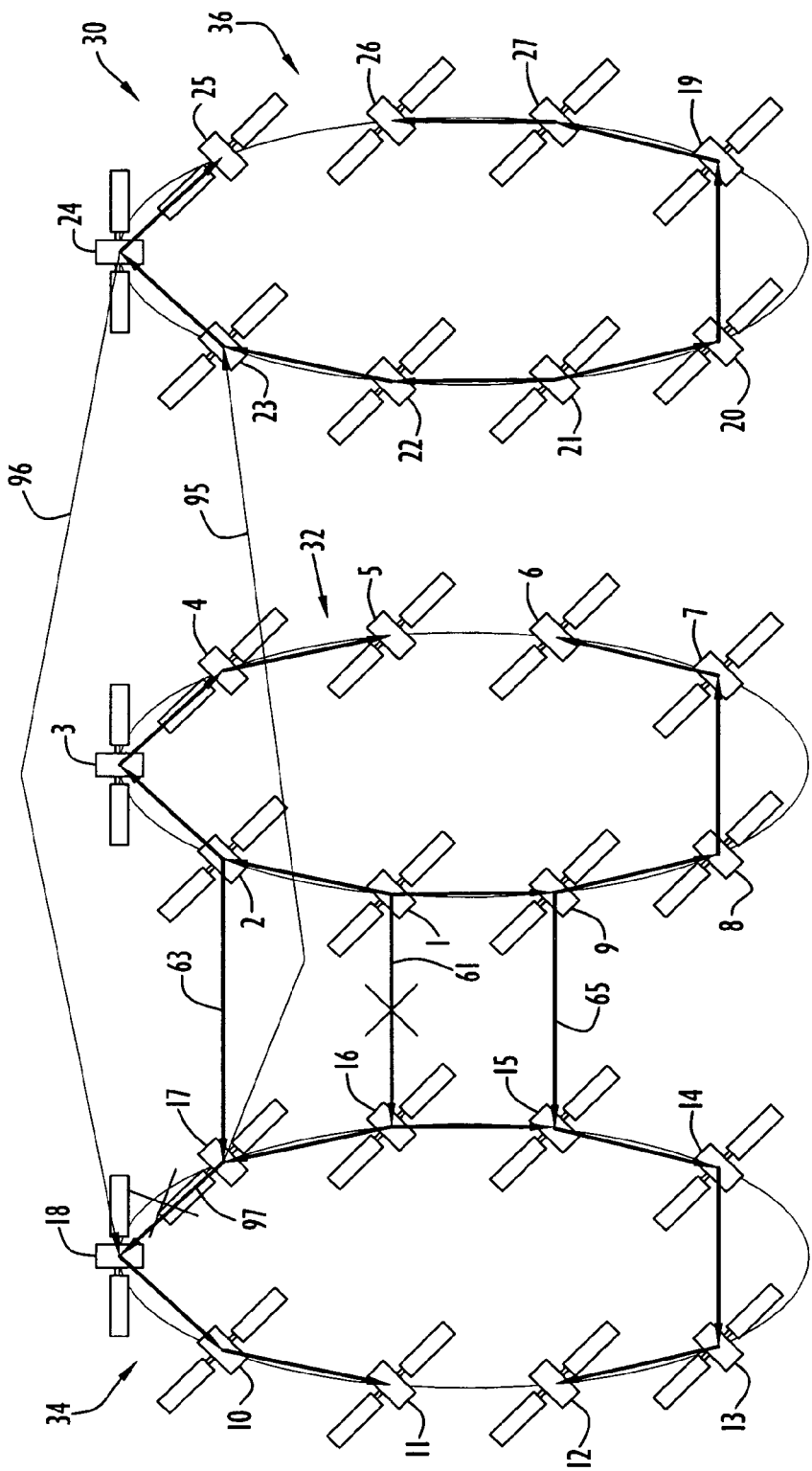
FIG. 8 is a diagrammatic illustration of an exemplary satellite communication network employing packet multicasts in the presence of broken cross-plane and in-plane links according to the present invention.

An example of a multicast transmission according to the present invention in the presence of broken in-plane and cross-plane links is illustrated in FIG. 8. Initially, network 30 is substantially similar to the network described above. Source satellite 1 is to send a packet to cross-plane members 10 and 13, where cross-plane link 61 (e.g., between satellites 1 and 16) and in-plane link 97 (e.g., between satellites 17 and 18) are broken. Source satellite 1 transmits the packet using in-plane links to satellites 2 and 9. The packet includes a group member list containing satellites 10 and 13 from plane 34, the hop count and the flag for plane 34 set within the plane list. Satellites 2 and 9 detect group members 10 and 13 from plane 34 in the packet and forward the packet via cross-plane links 63, 65 to satellites 17, 15, respectively. Satellite 17 receives the packet and transmits the multicast packet via cross-plane link 95 (e.g., between satellites 17 and 23) to satellite 23 of plane 36. If a satellite has two planes to choose from, packets are sent to both planes to increase the probability of successful transmission, while duplicate packets are detected and removed. The flag for plane 36 is set within the plane list and the maximum hop count is increased by $(L+1)/2$. Satellite 23 forwards the packet to satellite 24 in a clockwise fashion. Satellite 24 determines that the multicast packet has members from plane 34 and transmits the packet via cross-plane link 96 (e.g., between satellites 18 and 24) to satellite 18 of plane 34 with the flag for plane 34 set in the plane list. Satellite 18 forwards the multicast packet to satellite 10. Alternatively, satellite 17 may send the packet in a clockwise path; however, this packet is discarded since a duplicate packet is detected at satellite 15. When satellite 15 receives the packet from satellite 9, the packet is forwarded in a clockwise direction to reach satellite 13. Satellite 15 may alternatively send a packet counter-clockwise, but the packet is discarded at satellite 17 due to duplicate detection.

The present invention is not limited to the network configuration described above and may be employed with networks including any quantity of planes and/or satellites. For example, a network with N planes in the satellite constellation desires a source satellite node in a first plane to send a multicast packet to group members in a plurality of other orbital planes. Accordingly, the source node sends multicast packets to nodes in two adjacent planes. The nodes subsequently send the packets to two additional planes. This process continues until all the intended planes are reached. Upon reaching the intended planes, the multicast packet is forwarded based upon the in-plane techniques described above. If a plane is reached with no multicast members, the satellite in that plane is used as a relay to reach other planes.

If broken links exist within or between planes, the techniques described above are utilized to bypass the broken links. This is accomplished by selecting an alternative path to reach the planes, where one node in each of the adjacent planes is responsible for reaching new planes. By way of example and referring back to the example of FIG. 7, satellite 2 is the node responsible for reaching new planes. The multicast packet transmitted from satellite 1 to satellite 2 has all the flags set for the desired planes, while the packet transmitted from satellite 1 to satellite 9 has the flag set for plane 34. Accordingly, satellite 17 receives the packet and determines that the node is responsible for reaching new planes based on the set flags within the plane list. The process is repeated to reach all planes with multicast members.

It will be appreciated that the embodiments described above and illustrated in the drawings represent only a few of the many ways of implementing a method and apparatus for multicast packet distribution in a satellite constellation network.

The network may be implemented by any type of network (e.g., LAN, WAN, satellite, wireless, etc.) with any quantity of stationary nodes, or with any quantity of mobile nodes where down time, node location and/or topology changes may be predicted. The network may include any quantity of any conventional or other satellites (e.g., LEO, GEO, MEO), ground stations or other network nodes arranged in any desired fashion and at any locations. The satellites and ground stations may include any quantity of any types of links (e.g., in-plane links, cross-plane links, uplinks, downlinks, etc.) to any desired nodes (e.g., in-plane or cross-plane nodes, etc.) to facilitate communications. The links may employ any suitable communications medium (e.g., radio or other signal energy of any desired frequency, various transmission media, etc.).

The network may include any quantity of orbital planes with each plane including any quantity of satellite nodes. The satellite nodes may be arranged within the planes in any desired fashion or topology. The satellite nodes may select links based on any desired criteria (e.g., distances, visibility, signal strength, etc.) and may repeatedly determine links at any desired time intervals (e.g., seconds, minutes, etc.). The satellite nodes may include links to any desired satellites within any planes in a suitable transmission range. The multicast groups may include any quantity of destination nodes residing in any quantity of planes. The groups may be formed in any desired fashion based on any suitable criteria (e.g., location, information to be distributed, etc.).

The network nodes may determine status of links (e.g., enabled, uni-directional or bi-directional, etc.) via any types of neighbor discovery or other messages. The messages may include any desired information (e.g., fields, values, etc.) and may be transmitted at any desired intervals. Further, a link may be considered disabled in response to not receiving a message within any desired quantity of time intervals.

The satellite node may include any quantity of any conventional or other components (e.g., router, processor, transceiver, antenna, etc.). The router processor may be implemented by any conventional or other processor or controller. The transceiver may include any quantity of any conventional or other receiving and transmitting devices. The antenna may be of any quantity (e.g., a receiving antenna and a transmitting antenna, etc.) and may be implemented by any conventional or other suitable type of antenna enabling transmission and reception.

The router of the present invention may be of any quantity, and may be implemented by any conventional or other routing device or unit. The router may include any quantity of any conventional or other processor (e.g., microprocessor, controller, etc.) or circuitry. The processor may include any quantity of software and/or hardware modules or units. The functions of the modules may be distributed in any manner among any quantity of software and/or hardware modules within or external of the router. The software for the processor may be implemented in any suitable computer language, and could be developed by one of ordinary skill in the computer and/or programming arts based on the functional description contained herein and the flow charts and diagrams illustrated in the drawings. Further, any references herein of software performing various functions generally refer to processors performing those functions under software control. The software and/or algorithms described above and illustrated in the drawings may be modified in any manner that accomplishes the functions described herein.

The router and/or processor may include any quantity of any type of applications (e.g., satellite, router, ground station, protocols, etc.) or application modules. The router may employ any suitable routing protocol (e.g., OSPF, link-state, distance vector, etc.). The routing database and routing table may be implemented by any quantity of any conventional or other storage structures (e.g., database, table, file, record, array, data structure, etc.). The routing table may include any desired routing information arranged in any fashion. The routing paths may be based on any suitable criteria (e.g., shortest path, etc.). The routing table may include any quantity of primary or alternative paths for the satellite nodes, where the information may be arranged in the table in any fashion (e.g., based on priority of utilization, etc.). The alternative paths may route the packet through any desired satellite nodes or planes in accordance with any desired criteria (e.g., propagation delay, shortest path, available links, etc.). The routing table may not be updated, or updated at any desired time interval. The satellites may utilize any quantity or combination of primary and alternative paths to transmit packets. The packets may be transmitted over any quantity of enabled satellite links, where duplicate packets may be discarded.

The satellite nodes may select an alternative path based on any desired criteria (e.g., link quality, range, received signal strength, transmission power, etc.), and may utilize one or more paths over any quantity of enabled satellite links to transmit packets to bypass broken links. The multicast packets may include any desired information (e.g., hop count, plane list, destination nodes, etc.). The plane list may include any quantity of any desired fields to represent any quantity of destination planes. The fields may be arranged in any fashion, may be of any type and include any desired length (e.g., any quantity of bits, characters, symbols, etc.), and may utilize any desired values to indicate the intended planes. Further, each plane list field may be associated with any quantity of planes. The hop count may be determined in any suitable fashion (e.g., fixed quantity, such as nodes in a plane or network, determine the hop count from the routing path, etc.) enabling a packet to reach a destination node. The member list may include any quantity of any desired identifiers to indicate destination nodes (e.g., address, node identifier, etc.).

The variables utilized herein (e.g., M, L, N, j, k, etc.) preferably relate to integer values; however, the variables may be of any type of numeric values (e.g., real, etc.).

From the foregoing description, it will be appreciated that the invention makes available a novel method and apparatus for multicast packet distribution in a satellite constellation network, wherein packets are multicast through the network in the presence of disabled links by each node determining and utilizing alternative routing paths to bypass those links.

Having described preferred embodiments of a new and improved method and apparatus for multicast packet distribution in a satellite constellation network, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A satellite communication unit of a satellite communication network to multicast a message within said network, wherein said network includes a plurality of orbital planes with each plane including a plurality of orbiting satellite communication units with corresponding communication links, said satellite communication unit comprising:
   a communication device to transmit an outgoing message within said network and to receive an incoming message from said network; and
   a routing processor to route multicast messages from said satellite communication unit through said network to corresponding orbiting destination satellite communication units each varying position within a respective plane, wherein said satellite communication unit resides within a first network plane and said multicast messages are each associated with selected ones of said destination satellite communication units and a routing path through said network, and wherein said communication unit includes communication links including common plane links facilitating communications between said satellite communication unit and other satellite communication units within said first plane and cross plane links facilitating communications between said satellite communication unit and other satellite communication units in different planes, and said routing processor includes:
      a multicast module to determine an alternative path for a multicast message to a corresponding selected destination satellite communication unit based on enabled communication links of said satellite communication unit in response to a disabled communication link of said satellite communication unit associated with said routing path;
      a link module to periodically select said cross plane links at predetermined time intervals by determining distance values between said satellite communication unit and other orbiting satellite communication units in different planes and selecting said cross plane links based on at least said determined distance values to said other satellite communication units; and
      a transmission module to facilitate transmission of said multicast message along said associated routing path in response to an enabled communication link of said satellite communication unit associated with said routing path, and to facilitate transmission of said multicast message along said alternative path in response to a disabled communication link of said satellite communication unit associated with said routing path.

2. The satellite communication unit of claim 1, wherein said multicast module determines said alternative path without updated link state information pertaining to each satellite communication unit within said alternative path.

3. The satellite communication unit of claim 1, wherein said multicast module further includes:
   a routing module to determine said associated routing path for each multicast message and to identify at least one corresponding communication link of said satellite communication unit in accordance with said associated routing path.

4. The satellite communication unit of claim 3, wherein said routing module determines said associated routing path without updated link state information pertaining to each satellite communication unit within said routing path.

5. The satellite communication unit of claim 1, wherein said routing processor further includes:
   a link status module to monitor and determine the status of said common plane and cross plane links of said satellite communication unit.

6. The satellite communication unit of claim 1, wherein said common plane links include a link to a succeeding satellite communication unit within said first plane and a link to a preceding satellite communication unit within said first plane.

7. The satellite communication unit of claim 1, wherein said link module further includes:
   a link selection module to select cross plane links to satellite communication units in different planes, via a link selection table, based on said distance values, visibility and status of links between said satellite communication unit and said satellite communication units in said different planes.

8. The satellite communication unit of claim 1, wherein said multicast module includes:
   a common link bypass module to determine said alternative path to a destination satellite communication unit within said first plane based on enabled common plane links of said satellite communication unit in response to a failure of a common plane link of said satellite communication unit associated with said routing path.

9. The satellite communication unit of claim 1, wherein said multicast module includes:
   a common link bypass module to determine said alternative path through at least one other plane to a destination satellite communication unit within said first plane based on enabled cross plane links of said satellite communication unit in response to a failure of each common plane link of said satellite communication unit.

10. The satellite communication unit of claim 1, wherein said multicast module includes:
    a cross link bypass module to determine said alternative path through at least one other satellite communication unit in said first plane to a destination satellite communication unit of a different plane in response to a failure of a cross plane link of said satellite communication unit associated with said routing path.

11. The satellite communication unit of claim 1, wherein said multicast message includes a list of said selected destination satellite communication units and a hop count.

12. The satellite communication unit of claim 11, wherein said multicast module further includes:
- a reception module to receive an incoming multicast message;
- a message processing module to remove said satellite communication unit from said destination list of said incoming multicast message and process said incoming multicast message in response to the presence of said satellite communication unit within said destination list;
- a decrement module to decrement said hop count of said incoming multicast message;
- a discard module to discard said incoming multicast message in response to at least one of an empty destination list and a zero hop count value; and
- a forwarding module to facilitate forwarding of said incoming multicast message with said decremented hop count and destination list in response to said destination list including at least one destination satellite communication unit and said hop count value exceeding zero.

13. A satellite communication network comprising:
a plurality of orbiting satellite nodes arranged into a plurality of orbital planes with each satellite node varying position within a respective plane and including common plane links to other satellite nodes within the same plane and cross plane links to satellite nodes within different planes, wherein said satellite nodes facilitate transfer of a multicast packet to a plurality of orbiting destination nodes and each multicast packet is associated with selected ones of said destination nodes and a routing path through said network;
wherein each satellite node includes:
- a multicast module to determine an alternative path for a multicast message to a corresponding selected destination node based on enabled communication links of said satellite node in response to a disabled communication link of said satellite node associated with said routing path;
- a link module to periodically select said cross plane links at predetermined time intervals by determining distance values between said satellite node and other orbiting satellite nodes in different planes and selecting said cross plane links based on at least said determined distance values to said other satellite nodes; and
- a transmission module to facilitate transmission of said multicast message along said associated routing path in response to an enabled communication link of said satellite node associated with said routing path, and to facilitate transmission of said multicast message along said alternative path in response to a disabled communication link of said satellite node associated with said routing path.

14. The satellite communication network of claim 13, wherein said multicast module determines said alternative path without updated link state information pertaining to each satellite node within said alternative path.

15. The satellite communication network of claim 13, wherein said multicast module further includes:
- a routing module to determine said associated routing path for each multicast message and to identify at least one corresponding communication link of said satellite node in accordance with said associated routing path.

16. The satellite communication network of claim 15, wherein said routing module determines said associated routing path without updated link state information pertaining to each satellite node within said routing path.

17. The satellite communication network of claim 13, wherein said multicast module includes:
- a common link bypass module to determine said alternative path to a destination satellite node within the same plane as said satellite node based on enabled common plane links of said satellite node in response to a failure of a common plane link of said satellite node associated with said routing path.

18. The satellite communication network of claim 13, wherein said multicast module includes:
- a common link bypass module to determine said alternative path through at least one other plane to a destination satellite node within the same plane as said satellite node based on enabled cross plane links of said satellite node in response to a failure of each common plane link of said satellite node.

19. The satellite communication network of claim 13, wherein said multicast module includes:
- a cross link bypass module to determine said alternative path through at least one other satellite node in the same plane as said satellite node to a destination satellite node of a different plane in response to a failure of a cross plane link of said satellite node associated with said routing path.

20. A method of distributing a multicast message within a satellite communication network, wherein said network includes a plurality of orbital planes with each plane including a plurality of orbiting satellite nodes with corresponding communication links, and wherein each multicast message is associated with selected destination satellite nodes and a routing path through said network, said method comprising:
- (a) routing a multicast message from a satellite node through said network to said corresponding selected destination satellite nodes each varying position within a respective plane, wherein each satellite node includes communication links including common plane links facilitating communications between satellite nodes within the same plane and cross plane links facilitating communications between satellite nodes in different planes;
- (b) at each satellite node traversed by said multicast message, determining an alternative path for said multicast message to a corresponding selected destination satellite node based on enabled communication links of said traversed node in response to a disabled communication link of said traversed node associated with said routing path, and transmitting said multicast message along said associated routing path in response to an enabled communication link of said traversed node associated with said routing path and along said alternative path in response to a disabled communication link of said traversed node associated with said routing path; and
- (c) periodically selecting said cross plane links of said satellite nodes at predetermined time intervals by determining distance values between said satellite nodes in different planes and selecting said cross plane links based on at least said determined distance values.

21. The method of claim 20, wherein step (b) further includes:
- (b.1) determining said alternative path without updated link state information pertaining to each satellite node within said alternative path.

22. The method of claim 20, wherein step (a) further includes:
- (a.1) at each traversed satellite node, determining said associated routing path for said multicast message and identifying at least one corresponding communication link in accordance with said associated routing path.

23. The method of claim 22, wherein step (a.1) further includes:
   (a.1.1) determining said associated routing path without updated link state information pertaining to each satellite node within said routing path.

24. The method of claim 20, wherein step (a) further includes:
   (a.1) at each satellite node, monitoring and determining the status of said common plane and cross plane links.

25. The method of claim 20, wherein said common plane links of each satellite node include a link to a succeeding satellite node within the same plane and a link to a preceding satellite node within the same plane.

26. The method of claim 20, wherein step (c) further includes:
   (c.1) at each satellite node, selecting cross plane links to satellite nodes in different planes, via a link selection table, based on said distance values, visibility and status of links to said satellite nodes in said different planes.

27. The method of claim 20, wherein step (b) further includes:
   (b.1) determining said alternative path to a destination satellite node within the same plane as said traversed node based on enabled common plane links of said traversed node in response to a failure of a common plane link of said traversed node associated with said routing path.

28. The method of claim 20, wherein step (b) further includes:
   (b.1) determining said alternative path through at least one other plane to a destination satellite node within the same plane as said traversed node based on enabled cross plane links of said traversed node in response to a failure of each common plane link of said traversed node.

29. The method of claim 20, wherein step (b) further includes:
   (b.1) determining said alternative path through at least one other satellite node in the same plane as said traversed node to a destination satellite node of a different plane in response to a failure of a cross plane link of said traversed node associated with said routing path.

30. The method of claim 20, wherein said multicast message includes a list of said selected destination nodes and a hop count.

31. The method of claim 30, wherein step (b) further includes:
   (b.1) receiving said multicast message;
   (b.2) removing said receiving satellite node from said destination list of said multicast message and processing said multicast message in response to the presence of said receiving satellite node within said destination list;
   (b.3) decrementing said hop count of said multicast message;
   (b.4) discarding said multicast message in response to at least one of an empty destination list and a zero hop count value; and
   (b.5) forwarding said multicast message with said decremented hop count and destination list in response to said destination list including at least one destination satellite node and said hop count value exceeding zero.

* * * * *